US008721843B2

(12) United States Patent
Fullerton et al.

(10) Patent No.: US 8,721,843 B2
(45) Date of Patent: May 13, 2014

(54) METHOD FOR PRODUCING GRAPHENE IN A MAGNETIC FIELD

(75) Inventors: Larry W. Fullerton, New Hope, AL (US); Mark D. Roberts, Huntsville, AL (US)

(73) Assignee: Cedar Ridge Research, LLC, New Hope, AL (US)

( * ) Notice: Subject to any disclaimer, the term of this patent is extended or adjusted under 35 U.S.C. 154(b) by 228 days.

(21) Appl. No.: 13/317,280

(22) Filed: Oct. 13, 2011

(65) Prior Publication Data

US 2012/0090982 A1  Apr. 19, 2012

Related U.S. Application Data

(60) Provisional application No. 61/455,211, filed on Oct. 15, 2010.

(51) Int. Cl.
*B01J 37/34* (2006.01)

(52) U.S. Cl.
CPC .......... *B01J 37/342* (2013.01); *B01J 2219/085* (2013.01)
USPC ........................ 204/157.47; 204/155; 204/156

(58) Field of Classification Search
CPC ............ C01B 31/0438; C01B 31/0446; B01J 37/342; B01J 2219/085; B01J 19/08
USPC .................. 204/157.47, 156, 155; 422/186.1; 977/842
See application file for complete search history.

(56) References Cited

U.S. PATENT DOCUMENTS

| | | | | |
|---|---|---|---|---|
| 3,225,608 A | * | 12/1965 | Ivan ............................. | 74/5.6 C |
| 3,447,842 A | * | 6/1969 | Steingroever ................ | 310/90.5 |
| 5,049,540 A | * | 9/1991 | Park et al. ..................... | 209/212 |
| 5,053,344 A | * | 10/1991 | Zborowski et al. ........... | 209/212 |
| 5,396,136 A | * | 3/1995 | Pelrine ......................... | 310/90.5 |
| 6,361,749 B1 | * | 3/2002 | Terstappen et al. ...... | 422/186.01 |
| 6,902,065 B2 | * | 6/2005 | Kimura et al. ................ | 209/214 |
| 6,936,228 B2 | * | 8/2005 | Hirakata et al. ......... | 422/186.03 |
| 2003/0012717 A1 | * | 1/2003 | Agnew et al. ............ | 422/186.01 |
| 2009/0081383 A1 | * | 3/2009 | Alberding et al. ............ | 977/844 |
| 2011/0003453 A1 | * | 1/2011 | Jang ...................... | 257/E21.008 |
| 2011/0268910 A1 | * | 11/2011 | Bratkovski et al. ............. | 428/78 |
| 2012/0134910 A1 | * | 5/2012 | Height et al. ................. | 422/187 |
| 2012/0258311 A1 | * | 10/2012 | Hong et al. ................... | 977/842 |

OTHER PUBLICATIONS

Volotskova et al, "Single-step synthesis and magnetic separation of graphene and carbon nanotubes in arc discharge plasmas," Nanoscale, 2010, vol. 2, pp. 2281-2285 (published online Aug. 16, 2010, with supplementary material [ESI]).*

(Continued)

*Primary Examiner* — Keith Hendricks
*Assistant Examiner* — Colleen M Raphael
(74) *Attorney, Agent, or Firm* — Venable LLP; Robert S. Babayi

(57) ABSTRACT

An improved system and method for generating graphene involves producing a plurality of ionized carbon atoms in a plasma generation chamber and providing the plurality of ionized carbon atoms to a graphene generation chamber having a magnetic structure. The graphene generation chamber generates graphene from said plurality of ionized carbon atoms over said magnetic structure such that said graphene floats over said magnetic structure due to said graphene being diamagnetic. The rate at which the plurality of ionized carbon atoms is produced is controlled to control the rate of graphene generation. The magnetic field of the magnetic structure can be controlled to control the rate at which the generated graphene moves through the graphene generation chamber until it exits as a recovered graphene product.

18 Claims, 4 Drawing Sheets

(56) References Cited

OTHER PUBLICATIONS

Koshino et al, "Magnetic Field Screening and Mirroring in Graphene," Phys. Rev. Lett. 102, 177203 (2009).*

Malesevic et al, "Synthesis of few-layer graphene by microwave plasma-enhanced chemical vapour deposition," Nanotechnology vol. 19 (2008) 305604 (6 pp.).*

Sharma et al, "Diamagnetism of graphite," Phys. Rev. B vol. 9, No. 6, Mar. 15, 1974, pp. 2467-2475.*

Hiramatsu et al, "Fabrication of vertically aligned carbon nanowalls using capacitively coupled plasma-enhanced chemical vapor deposition assisted by hydrogen radical injection," Appl. Phys. Let. 84, 4708 (2004).*

Wang et al, "Synthesis of carbon nanosheets by inductively coupled radio-frequency plasma enhanced chemical vapor deposition," Carbon 42 (2004) pp. 2867-2872.*

Dato et al, "Substrate-free gas-phase synthesis of graphene sheets," Nano Letters 2008, vol. 8, No. 7, pp. 2012-2016.*

Kim et al, "The structural and electrical evolution of graphene by oxygen plasma-induced disorder," 2009 Nanotechnology vol. 20, 375703.*

Kane, "Levitated Spinning Graphene," arXiv:10063774v1 (Jun. 18, 2010).*

Inui et al, "Quantum levitation of graphene sheet by repulsive Casimir forces," e-J. Surf. Sci. Nanotech. vol. 8 (2010) pp. 57-61.*

Levchenko et al, "The large-scale production of graphene flakes using magnetically-enhanced arc discharge between carbon electrodes," Carbon 48 (2010) pp. 4556-4577.*

Bae et al, "Roll-to-roll production of 30-inch graphene films for transparent electrodes," Nature Nanotechnology, vol. 5, pp. 574-578, Jun. 2010.*

\* cited by examiner (SIDE VIEW)

(TOP VIEW)

(TOP VIEW)

US 8,721,843 B2

METHOD FOR PRODUCING GRAPHENE IN A MAGNETIC FIELD

FIELD OF THE INVENTION

The present invention relates generally to a system and method for generating a continuous graphene film. More particularly, the present invention relates to a system and method for producing grapheme using a continuous manufacturing web process whereby an even plasma distribution generated by ionization of a carbon atom source produces a glow discharge of carbon atoms at a desired rate allowing the continuous growth of a graphene film floating over a magnetic surface.

BACKGROUND OF THE INVENTION

Current systems and methods for producing graphene film such as using tape to remove a layer of graphene from graphite are generally ad hoc and uncontrollable. It is therefore desirable to have an improved system and method for producing graphene of sufficient quality and quantity for commercial purposes.

SUMMARY OF THE INVENTION

The present invention is an improved system and method for generating graphene by floating graphene as it is generated over a magnetic field. In accordance with one embodiment of the invention, a method for generating graphene includes the steps of producing a plurality of ionized carbon atoms, providing a magnetic field, and generating graphene from the plurality of ionized carbon atoms, where the graphene is generated over the magnetic field such that the graphene floats over the magnetic field due to graphene being diamagnetic.

The step of generating of the graphene from the plurality of ionized carbon atoms could further include the steps of providing a graphene seed and providing the plurality of ionized carbon atoms to the graphene seed to generate the graphene. Under one arrangement, the graphene seed can be oriented to produce a graphene film whose hexagonal structure is grown at a preferred angle.

The step of producing the plurality of ionized carbon atoms could involve using generated plasma to strip the plurality of ionized carbon atoms from a carbon source, where generating plasma could further involve providing the carbon atom source, an inert gas, and an ionizing energy source, controlling the ratio of the carbon atom source to said inert gas, an absolute pressure, and an energy density of a plasma resulting from the ionized energy source to control a glow discharge and a distribution of the plasma, where the glow discharge produces the plurality of ionized carbon atoms.

Under one arrangement, the absolute pressure is controlled to achieve a mean free path of molecules between collisions to produce the glow discharge and an even distribution of the plasma, where a resulting carbon atom cloud causes a graphene film to grow continuously from an initial location of a graphene seed.

A carbon atom source can be at least one of methane, carbon dioxide, or carbon monoxide or the like. Preferably, a carbon atom source would have only one carbon atom thereby simplifying the stripping process.

An inert gas can be at least one of helium, argon, krypton, neon, or xenon.

An ionizing energy source can be one of a radio frequency source such as a microwave signal or a high voltage source.

The step of generating the graphene from said plurality of ionized carbon atoms could include the steps of providing said plurality of ionized carbon atoms to a graphene seed in a graphene generation chamber having a magnetic structure, where the graphene moves through the graphene generation chamber until it exits a recovery portion as a recovered graphene product.

The magnetic structure could be permanent magnetic material magnetized such that the magnetic field strength of the magnetic structure is strongest near the initial location of the graphene seed and the magnetic strength of the magnetic structure becomes progressively weaker until it is weakest near the end of said recovery portion of the graphene generation chamber causing a downward slope of the graphene that causes gravitational forces to move the graphene through and exit the graphene generation chamber.

Under one arrangement, the magnetic field strength of the magnetic field can be controlled along the magnetic structure to control the rate at which the graphene moves through and exits the graphene generation chamber.

Under another arrangement, the one or more lasers can be used to trim the graphene to achieve a desired shape.

In an alternative arrangement, a second magnetic field is provided that is above the graphene.

The outer edges along its length of the magnetic field could exhibit stronger field strengths than the center portion of the magnetic field.

Under still another arrangement, the graphene is pulled down a graphene generation chamber as a result of a rolling process used to produce a roll of said graphene, where the turning rate of said roll of the graphene is controlled to correspond to a rate of growth of the graphene.

In accordance with another embodiment of the invention, a system for generating graphene comprises a source of a plurality of ionized carbon atoms and a graphene generator having a magnetic structure, where the graphene generator receives the plurality of ionized carbon atoms from the source of the plurality of ionized carbon atoms and the graphene generator generates the graphene from said plurality of ionized carbon atoms over the magnetic structure such that said graphene floats over the magnetic structure due to the graphene being diamagnetic.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

The present invention provides an improved system and method for producing graphene from a source of ionized carbon atoms by generating graphene from the ionized carbon atoms over a magnetic structure such that the generated graphene floats over the magnetic structure.

Figure 1A:
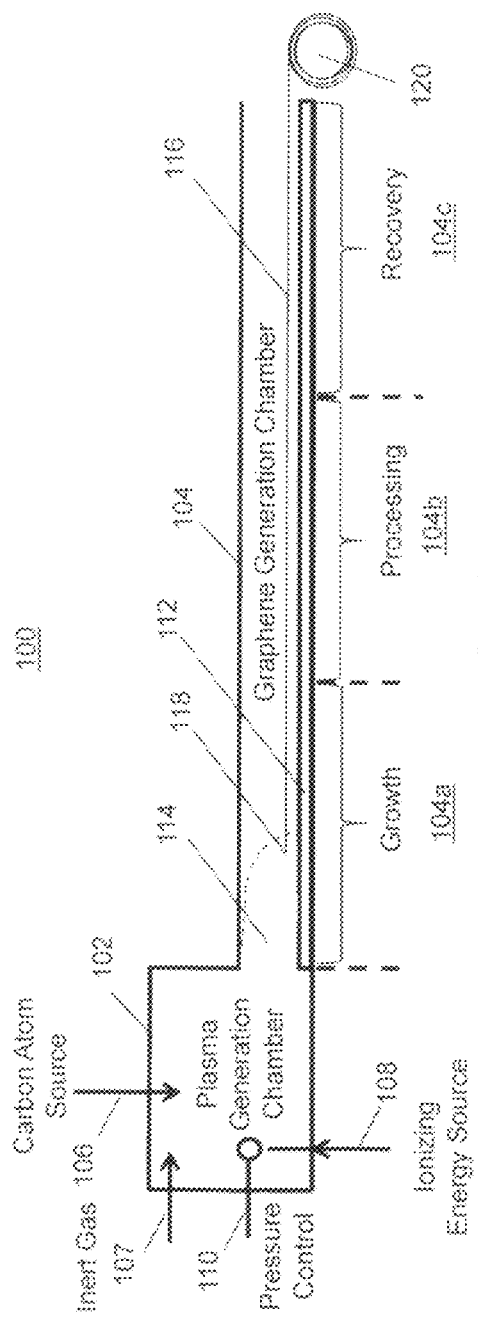
FIG. 1A depicts an exemplary graphene production system.

FIG. 1A depicts an exemplary graphene production system 100 including a plasma generation chamber 102 and a graphene generation chamber 104. The graphene generation chamber 104 may have multiple subchambers including a growth portion 104a, one or more optional processing portions 104b, and at least one recovery portion 104c. A carbon atom source 106, for example methane ($CH_4$), an inert gas 107, such as helium, argon, krypton, neon or xenon, and an ionizing energy source 108, for example a radio frequency (RF) or high voltage (HV) source, are provided to the plasma generation chamber 102, whereby a pressure control system 110 (e.g., a vacuum pump) is used to produce an absolute pressure within the plasma generation chamber 102 necessary to achieve a mean free path of molecules between collisions sufficient to produce a glow discharge and an even plasma distribution within the plasma generation chamber 102. A resulting carbon atom cloud 114 exiting the plasma generation chamber 102 causes a graphene film 116 to grow continuously from a location of a graphene seed 118 introduced into the graphene generation chamber 104. The continuously growing graphene film 116, which is paramagnetic, floats over a magnetic structure 112 and moves through the graphene production chamber until it exits the graphene generation chamber 104 as a recovered graphene product, for example, a roll of graphene 120.

One skilled in the art will recognize that many different types of carbon atom sources could be used with the invention such as $CH_4$ $CO_2$, CO, and the like. In a preferred embodiment, the carbon atom source would have only one carbon atom to simplify the stripping of the atom. One skilled in the art will also recognize that various ionizing energy sources could be used, for example, a 2.4 Ghz (microwave) signal.

As shown in FIG. 1A, the graphene film 116 may be pulled down the graphene generation chamber 104 as a result of a rolling process used to produce the roll of graphene 120, whereby a control system (not shown) controls the turning rate of the roll of graphene 120 to correspond to the rate of growth of the graphene film 116. The control system also controls the rate of growth of the graphene film 116 by controlling the ratio of the carbon atom source 106 to the inert gas 107, the absolute pressure within the chamber 102, and the energy density inside the chamber resulting from the ionizing energy source 108 and thus the glow discharge and plasma distribution in the plasma generation chamber 102. Generally, a control system can be a closed loop control system involving sensors and the like to measure the parameters of the system 100 being controlled.

In one alternative arrangement, an atomic beam of carbon can be accelerated in a conventional manner and then focused using electric and/or magnetic lensing. Furthermore, it can be passed through an inhomogeneous magnetic field acting in a manner similar to a spectrometer to enable separation (e.g., for atomic species and isotopic purification purposes) of different atoms to make an isotropically pure source beam (of carbon atoms) thereby resulting in a specific graphene composition.

In still another alternative arrangement, atomic beams could be used to interlace other types of atoms on the growth edge of the graphene film to produce composite materials much like weaving a blanket. Similarly, television raster technique might be employed. Many such similar techniques are possible as long as enough graphene is included in such composite materials whereby the graphene portion of the material will enable it to float above the magnetic structure and thereby move through and exit the graphene generation chamber as would a graphene-only film.

In yet still another alternative arrangement, the generated graphene film is merely a binder included to cause any other material of interest to be processed via the invention such that it floats through the graphene generation chamber.

One or more processing portions 104b may reside between the growth portion 104a and the recovery portion 104c of the graphene generation chamber 104. Various types of processing of the graphene film 116 are possible including, for example, lasers drawing conductive circuit board traces, applying other atoms using stereo lithography to build nanostructures and nanomachines, activating carbon and mixing impurities to produce semiconductors, etc.

Under one arrangement, the magnetic structure 112 is made up of multiple sources of permanent magnetic material magnetized such that the magnetic field strength of the sources of the magnetic structure 112 are strongest near the location of the graphene seed 118 and the magnetic strength of the sources of the magnetic structure 112 become progressively weaker until they are weakest near the end of the recovery portion 104c of the graphene generation chamber 104 causing a downward slope of the graphene film 116 that causes gravitational forces to move the graphene film through and exit the graphene generation chamber 104. Under another arrangement the magnetic structure 112 comprises electromagnets or electro-permanent magnets whereby the magnetic field strength along the magnetic structure 112 is varied to cause gravitational forces to move the graphene film 116 through and exit the graphene generation chamber 104. Under still arrangement, the control system varies the slope of graphene film 116 by controlling the magnetic field strength along the magnetic structure 112 so as to control (i.e., speed up or slow down) the rate at which the graphene film 116 moves through and exits the graphene generation chamber 104. Under yet another arrangement, one or more slopes of one or more parts of the magnetic structure 112 are mechanically controlled by the control system so as to control the effect of gravitational forces and thereby the rate at which the graphene film 116 moves through and exits the graphene generation chamber 104.

Figure 1B:
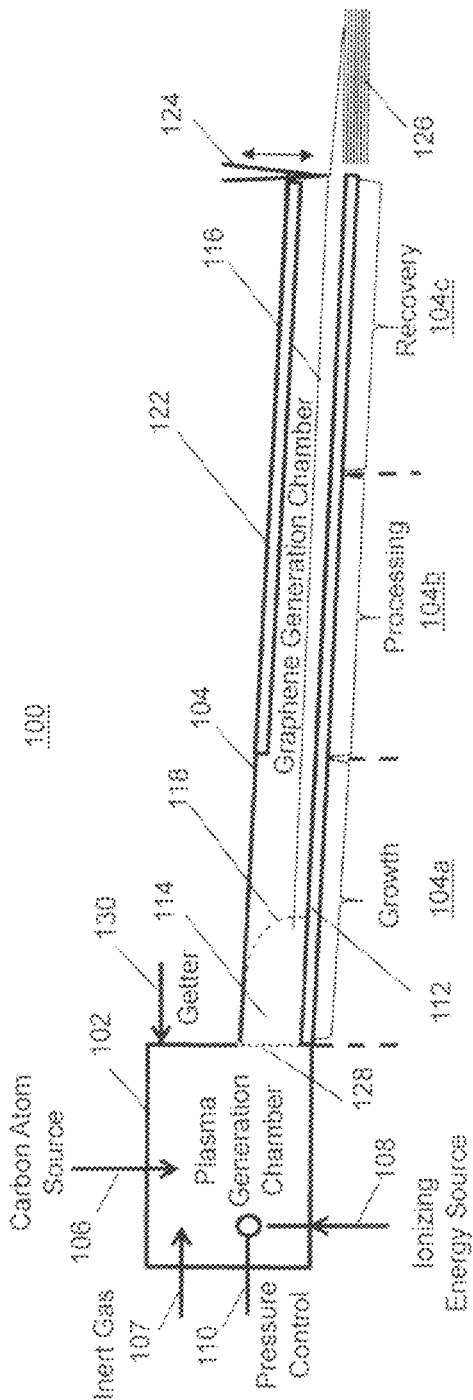
FIG. 1B depicts another exemplary graphene production system.

FIG. 1B depicts another exemplary graphene production system 100, which is similar to the graphene production system of FIG. 1A except the graphene generation chamber is slanted so that gravitational forces can be used to cause the graphite film to move through and exit the graphene generation chamber 104. The intent of this curvature is to create negative feedback to prevent the film from progressing backward into the ionization chamber. Other variations to the system 100 include a second magnetic structure 122, which could be used to control the height of the graphene film 116 particularly during processing but also during other portions of the chamber 104 such as within a recovery portion 104c. As depicted, a cutting mechanism 124 cuts the graphene film 116 into a recovered graphene product, for example, a stack of graphene films 126.

Also shown in FIG. 1B is an optional shield 128 used to prevent the ionization energy source from exiting the plasma generation chamber 102 and entering the graphene growth chamber 104. Alternatively, the opening between the plasma generation chamber 102 and the graphene growth chamber 104 can be selected based on waveguide cutoff properties to not allow signals. An optional getter 130 is also depicted, which can be used to remove atomic hydrogen from the plasma generation chamber 102.

Figure 2B:
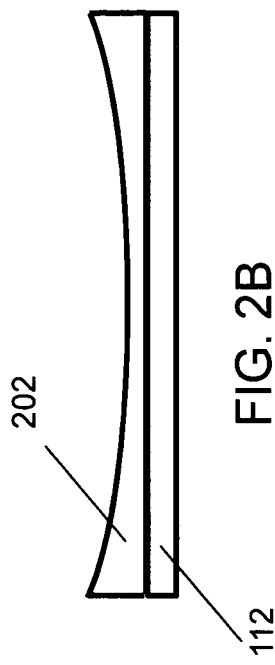
FIG. 2B depicts a cross section across the width of an exemplary bowl-shaped magnetic field of a magnetic structure.
Figure 2A:
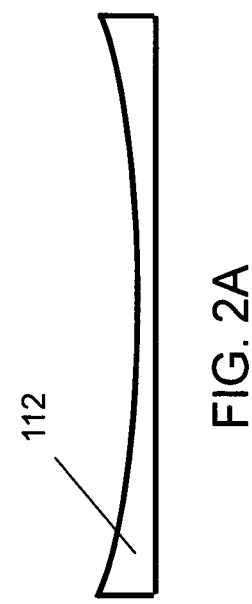
FIG. 2A depicts a cross section across the width of an exemplary bowl-shaped magnetic structure.
Figure 2C:
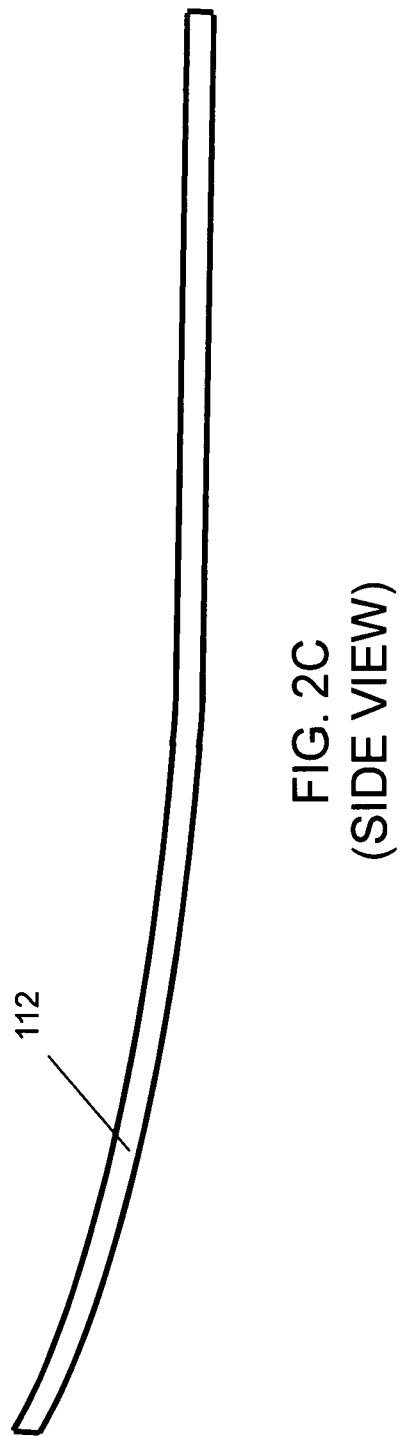
FIG. 2C depicts a side view of the length of an exemplary magnetic structure having a slope that decreases as the graphene film moves through the graphene generation chamber.

One skilled in the art will recognize that magnetization techniques can be employed to produce magnetic field characteristics for the magnetic structure 112 (and optionally the second magnetic structure 122) that assist in controlling movement and also growth characteristics of the graphene film 116. For example, the outer edges of the magnetic structure 112 along its length could exhibit stronger field strengths than the center portion so that the graphene film could be more easily maintained within the boundaries of the magnetic structure 112. FIG. 2A depicts a cross section of an exemplary bowl-shaped magnetic structure 112, which could alternatively be a bowl-shaped magnetic field 202 of a magnetic structure 112 such as shown in FIG. 2B. FIG. 2C depicts a side view of the length of an exemplary magnetic structure 112 having a slope that decreases as the graphene film 116 moves through the graphene generation chamber 104. Such a design is intended to support initial production of a graphene film 116 from a seed 118 so as to prevent the seed from growing towards the plasma generation chamber 102.

Figure 3B:
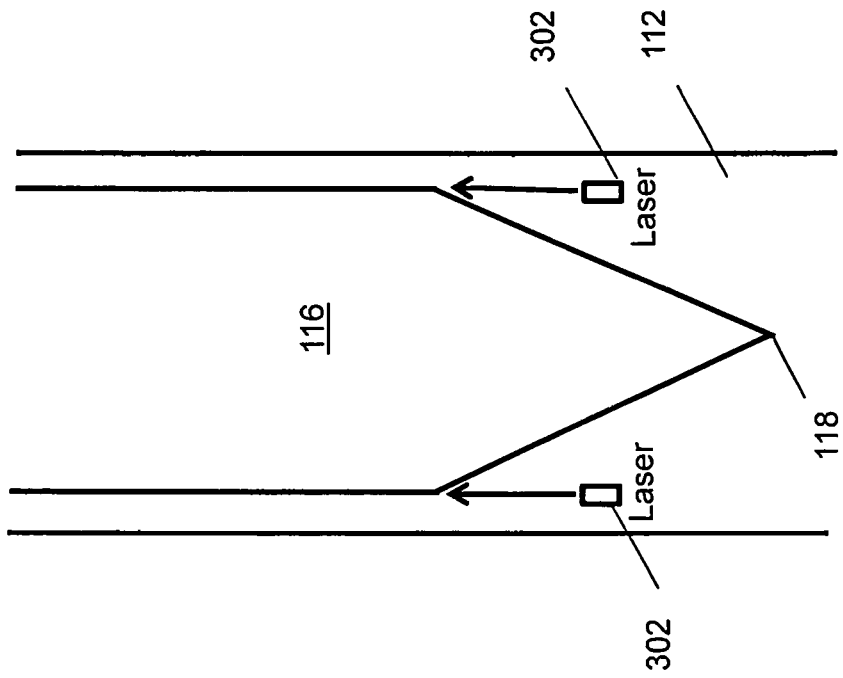
FIG. 3B depicts a top view of the growth of the graphene film from a location that a seed was introduced, where the graphene film is moving away from the location and floating above the magnetic structure of the graphene generation chamber.
Figure 3A:
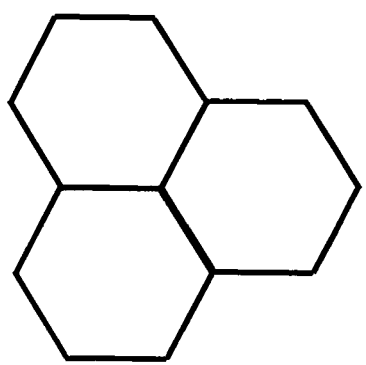
FIG. 3A depicts an exemplary graphene seed.

FIG. 3A depicts an exemplary graphene seed 300.

FIG. 3B depicts a top view of growth of the graphene film 116 from a location 118 that a seed was introduced into the graphene generation chamber 104, where the graphene film 116 is moving away from the location 118 and floating above the magnetic structure 112 of the graphene generation chamber 104. As shown, lasers 302 can be used to trim the graphene film 116 once outside the growth portion 104a of the graphene generation chamber 104 so as to achieve a desired shape. Eventually the growth edge will approach the shape of a flat growth edge.

One skilled in the art will recognize that various geometries for the graphene are possible such as carbon fiber nanotubes having different spiral (tilt) angles and the like where the seed has a desired number of atoms and atom tile along a cylinder. One skilled in the art will also recognize that different types of atoms such as boron can be used in place of carbon atoms in accordance with the invention. One skilled in the art will recognize that the seed may be initially oriented to produce a film whose hexagonal structure is grown at a preferred angle.

Figure 4:
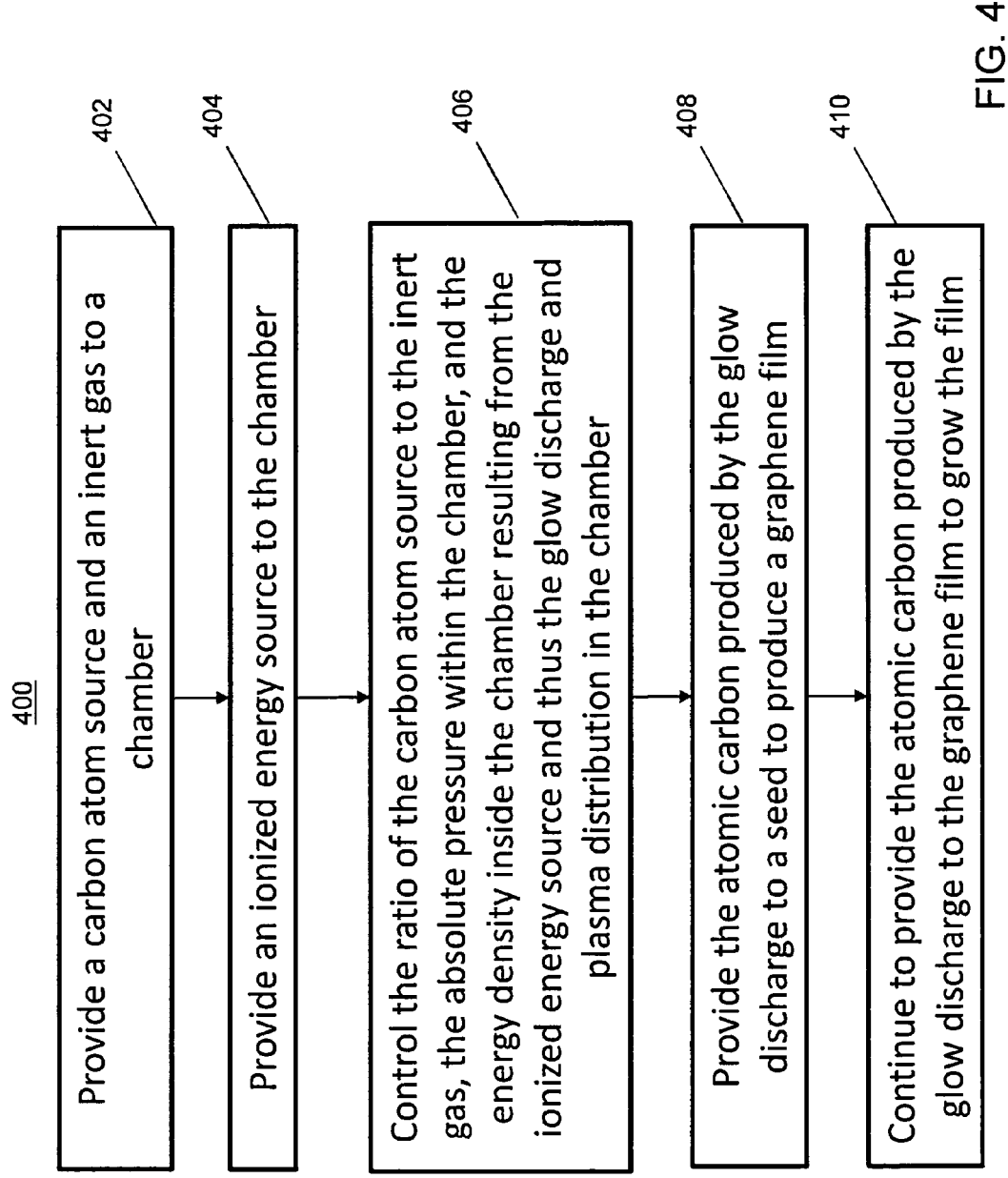
FIG. 4 depicts an exemplary method in accordance with the invention.

FIG. 4 depicts an exemplary method 400 in accordance with the invention. The method 400 includes five steps. The first step 402 is to provide a carbon atom source and an inert gas to a chamber. The second step 404 is to provide an ionizing energy source to the chamber. The third step 406 is to control the ratio of the carbon atom source to the inert gas, the absolute pressure within the chamber, and the energy density inside the chamber resulting from the ionizing energy source and thus the glow discharge and plasma distribution in the chamber. The fourth step 408 is to provide the ionized atomic carbon produced by the glow discharge to a seed to produce a graphene film and the fifth step 410 is to continue to provide the atomic carbon produced by the glow discharge to the graphene film to grow the film.

While particular embodiments of the invention have been described, it will be understood, however, that the invention is not limited thereto, since modifications may be made by those skilled in the art, particularly in light of the foregoing teachings.

The invention claimed is:

1. A method for generating graphene, comprising the steps of:
   producing a plurality of ionized carbon atoms in a carbon atom source, said plurality of ionized carbon atoms exiting said carbon atom source as a carbon atom cloud;
   providing a graphene generation chamber having a magnetic field that extends from a growth portion to a recovery portion, said growth portion of said graphene generation chamber receiving said carbon atom cloud as it exits said carbon atom source; and
   generating said graphene from said plurality of ionized carbon atoms, said graphene being generated over said magnetic field such that said graphene floats over said magnetic field due to said graphene being diamagnetic, said carbon atom cloud causing a floating graphene film to grow continuously from an initial location that is over said magnetic field within said growth portion of said graphene generation chamber, said floating graphene film moving away from said initial location and through said graphene generation chamber until it exits said recovery portion of said graphene generation chamber as a recovered graphene product.

2. The method of claim 1, wherein said step of generating said graphene from said plurality of ionized carbon atoms comprises the steps of:
   providing a graphene seed to said initial location; and
   providing said plurality of ionized carbon atoms to said graphene seed to generate said graphene.

3. The method of claim 2, wherein said graphene seed is oriented to produce a graphene film whose hexagonal structure is grown at an angle.

4. The method of claim 1, wherein said step of producing said plurality of ionized carbon atoms comprises stripping of said plurality of ionized carbon atoms from a carbon source using a plasma.

5. The method of claim 4, wherein generating plasma further comprises the steps of:
   providing said carbon atom source;
   providing an inert gas;
   providing an ionizing energy source;
   controlling the ratio of said carbon atom source to said inert gas;
   controlling an absolute pressure; and
   controlling an energy density of a plasma resulting from said ionized energy source to control a glow discharge and a distribution of said plasma, said glow discharge producing said plurality of ionized carbon atoms.

6. The method of claim 5, wherein said absolute pressure is controlled to achieve a mean free path of molecules between collisions to produce said glow discharge and an even distribution of said plasma.

7. The method of claim 5, wherein said carbon atom source comprises at least one of methane, carbon dioxide, or carbon monoxide.

8. The method of claim 5, wherein the chemical formula of said carbon atom source would have only one carbon atom.

9. The method of claim 5, wherein said inert gas comprises at least one of helium, argon, krypton, neon, or xenon.

10. The method of claim 5, wherein said ionizing energy source comprises one of a radio frequency source or a high voltage source.

11. The method of claim 10, wherein said radio frequency source is a microwave signal.

12. The method of claim 5, wherein the step of generating said graphene from said plurality of ionized carbon atoms comprises the step of:
provliding said plurality of ionized carbon atoms to a graphene seed provided at the initial location in the graphene generation chamber, said graphene generation chamber having a magnetic structure that produces said magnetic field, said magnetic structure extending from the growth portion to the recovery portion.

13. The method of claim 12, wherein said magnetic structure comprises permanent magnetic material magnetized such that the magnetic field strength of the magnetic structure is strongest near the initial location of the graphene seed and the magnetic strength of the magnetic structure becomes progressively weaker until it is weakest near the end of said recovery portion of said graphene generation chamber causing a downward slope of the graphene that causes gravitational forces to move the graphene through and exit the graphene generation chamber.

14. The method of claim 12, wherein a magnetic field strength of said magnetic field is controlled along said magnetic structure to control the rate at which said graphene moves through and exits said graphene generation chamber.

15. The method of claim 12, further comprising the step of:
trimming the graphene with at least one laser to achieve a desired shape.

16. The method of claim 1, further comprising the step of:
providing a second magnetic field above said graphene.

17. The method of claim 1, wherein the outer edges of said magnetic field along its length exhibit stronger field strengths than the center portion of said magnetic field.

18. The method of claim 1, further comprising the steps of:
pulling said graphene down a graphene generation chamber as a result of a rolling process used to produce a roll of said graphene; and
controlling the turning rate of said roll of said graphene to correspond to a rate of growth of said graphene.

* * * * *